United States Patent
Auger

(10) Patent No.: US 10,673,977 B2
(45) Date of Patent: Jun. 2, 2020

(54) SYSTEM AND METHOD FOR PROVIDING STATUS UPDATES

(71) Applicant: D2L CORPORATION, Kitchener (CA)

(72) Inventor: Jeremy Auger, Kitchener (CA)

(73) Assignee: D2L CORPORATION, Kitchener, Ontario (CA)

( * ) Notice: Subject to any disclaimer, the term of this patent is extended or adjusted under 35 U.S.C. 154(b) by 115 days.

(21) Appl. No.: 13/966,821

(22) Filed: Aug. 14, 2013

(65) Prior Publication Data

US 2014/0280579 A1  Sep. 18, 2014

Related U.S. Application Data

(60) Provisional application No. 61/787,051, filed on Mar. 15, 2013.

(51) Int. Cl.
| | |
|---|---|
| G06F 15/16 | (2006.01) |
| H04L 29/08 | (2006.01) |
| H04W 4/029 | (2018.01) |
| H04W 4/21 | (2018.01) |
| G06Q 50/00 | (2012.01) |
| G06Q 10/10 | (2012.01) |

(52) U.S. Cl.
CPC ........... *H04L 67/306* (2013.01); *G06Q 10/10* (2013.01); *G06Q 50/01* (2013.01); *H04W 4/029* (2018.02); *H04W 4/21* (2018.02)

(58) Field of Classification Search
USPC ................................................ 709/224, 204
See application file for complete search history.

(56) References Cited

U.S. PATENT DOCUMENTS

| | | | |
|---|---|---|---|
| 8,671,019 B1* | 3/2014 | Barclay | G07F 17/3244 463/25 |
| 2003/0177019 A1* | 9/2003 | Santos | G06Q 10/10 705/319 |
| 2009/0197234 A1* | 8/2009 | Creamer | G09B 7/00 434/350 |
| 2010/0211868 A1* | 8/2010 | Karmarkar | H04M 1/72547 715/234 |
| 2011/0161987 A1* | 6/2011 | Huang | H04L 51/24 719/318 |

(Continued)

*Primary Examiner* — Dhairya A Patel
(74) *Attorney, Agent, or Firm* — Gowling WLG (Canada) LLP; Neil W. Henderson

(57) ABSTRACT

A method and system for status updates are provided. The method for providing a status update includes: determining contextual data related to a user; retrieving suggested status updates related to the contextual data; presenting the suggest status updates to the user; receiving a selected status update from the user; and posting a status update based on the selected status update. The system for providing a status update includes: a context module configured to determine contextual data related to a user; a selection module configured to select suggested status updates related to the contextual data; a display module configured to display the suggested status updates to a user and receive a selected status update from the user; and a processing component configured to receive the selected status update and post the selected status update to a social media application.

23 Claims, 5 Drawing Sheets

(56) References Cited

U.S. PATENT DOCUMENTS

| | | | | |
|---|---|---|---|---|
| 2011/0258260 A1* | 10/2011 | Isaacson | ............... | H04L 51/32 |
| | | | | 709/206 |
| 2011/0264528 A1* | 10/2011 | Whale | ................ | H04W 4/21 |
| | | | | 705/14.58 |
| 2011/0288947 A1* | 11/2011 | Biran | ................ | G06Q 30/02 |
| | | | | 705/26.1 |
| 2012/0030282 A1* | 2/2012 | Brody | ................ | G06Q 50/01 |
| | | | | 709/203 |
| 2012/0124176 A1* | 5/2012 | Curtis | ................ | G06Q 50/01 |
| | | | | 709/219 |
| 2013/0086477 A1* | 4/2013 | Newrai | ............... | G06Q 50/22 |
| | | | | 715/738 |
| 2013/0290202 A1* | 10/2013 | Nunnery | ............ | G06Q 50/01 |
| | | | | 705/319 |
| 2013/0330704 A1* | 12/2013 | Creamer | ............ | G09B 7/00 |
| | | | | 434/362 |
| 2014/0020115 A1* | 1/2014 | Le Chevalier | ...... | G06F 17/241 |
| | | | | 726/28 |
| 2015/0066940 A1* | 3/2015 | Fernandes | ........... | G06Q 10/10 |
| | | | | 707/740 |
| 2015/0324753 A1* | 11/2015 | Dantuluri | .......... | G06Q 10/1095 |
| | | | | 705/7.19 |

\* cited by examiner

SYSTEM AND METHOD FOR PROVIDING STATUS UPDATES

RELATED APPLICATIONS

This application claims priority to U.S. Provisional Patent Application No. 61/787,051 filed Mar. 15, 2013, which is incorporated herein by reference.

FIELD

The present disclosure relates generally to social media applications. More particularly, the present disclosure relates to a system and method for providing status updates in social media applications.

BACKGROUND

Social media applications, including web sites, mobile device sites and network applications, have gained significant popularity in the last few years, and continue to grow at a rapid rate. New social media applications are being developed and the existing applications continue to receive new users.

Many social media applications allow users to enter data about themselves and include the option to allow users to enter status updates. For example, many social media applications typically allow users to enter brief updates about the user's current condition, location, feeling, events, or the like. Conventionally, these status updates are free form and are done ad-hoc and not necessarily on any regular basis. Status updates may also depend on the type of device and the amount of time the user has available.

In a developing area of this nature, it is advantageous to improve on previous systems and methods.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for providing a status update including: determining contextual data related to a user; retrieving suggested status updates related to the contextual data; presenting the suggested status updates to the user; receiving a selected status update from the user; and posting a status update based on the selected status update.

In some cases, the contextual data may include user attributes. In a particular case, the user attributes include at least one user attribute selected from among: user's calendar information, user's geo-location, user's movement, and user's social media inputs.

In some cases, the contextual data may include external attributes. In a particular case, external attributes include at least one external attribute selected from among: time, weather, traffic information and transit schedules.

In some cases, the suggested status updates may be selected from a predetermined taxonomy.

In some cases, the method may also include tracking statistics related to the selected status updates.

In a particular case, the method includes augmenting the suggested status updates with contextual data.

In some cases, the method may include posting the status update to multiple social networking sites.

In a further aspect, the present disclosure provides a system for providing a status update including: a context module configured to determine contextual data related to a user; a selection module configured to select suggested status updates related to the contextual data; a display module configured to display the suggested status updates to a user and receive a selected status update from the user; and a processing component configured to receive the selected status update and post the selected status update to a social media application.

In some cases, the system may include a memory module for storing the suggested status updates and the selected status update.

In some cases, the contextual data may include user attributes and/or external attributes.

In some cases, the selection module may be configured to select suggested status updates from a predetermined taxonomy.

In a particular case, the processing component may further be configured to post the selected status update to multiple social networking applications.

In some cases, the memory module may further be configured to track statistics related to the selected status updates.

In some cases, the selection module may be configured to augment the suggested status updates with contextual data.

In some cases, the context module may be further configured to retrieve contextual data from a learning management system.

In a particular case, the retrieved contextual data from the learning management system includes data may be related to the user's classes, grades or assignments.

In some cases, the processing component may be further configured to send the selected status update to a group of users within the learning management system.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides embodiments of a method and system for providing status updates. The embodiments herein are intended to facilitate a user in creating status updates and to assist the user in generating practical status updates in relation to real world events. In particular, in some embodiments, a user may select a status from a predetermined list and the selected status will be displayed in the user's chosen application. The predetermined list will provide the user with suggested status updates determined based on the user's contextual data, for example, the time of day, the user's calendar information, the user's geo-location and/or movement, the user's mobile device activity, the user's previous status, or the like. Having contextual and pre-determined options for the user's status is also intended to allow for more accurate data analytics that can be used for data mining without overly restricting the user's flexibility in status updates.

According to various embodiments, the predetermined list may provide the user with suggested responses to incoming messages (e.g., emails, SMS (Short Message Service) message, or the like) based on the user's context data.

Figure 1:
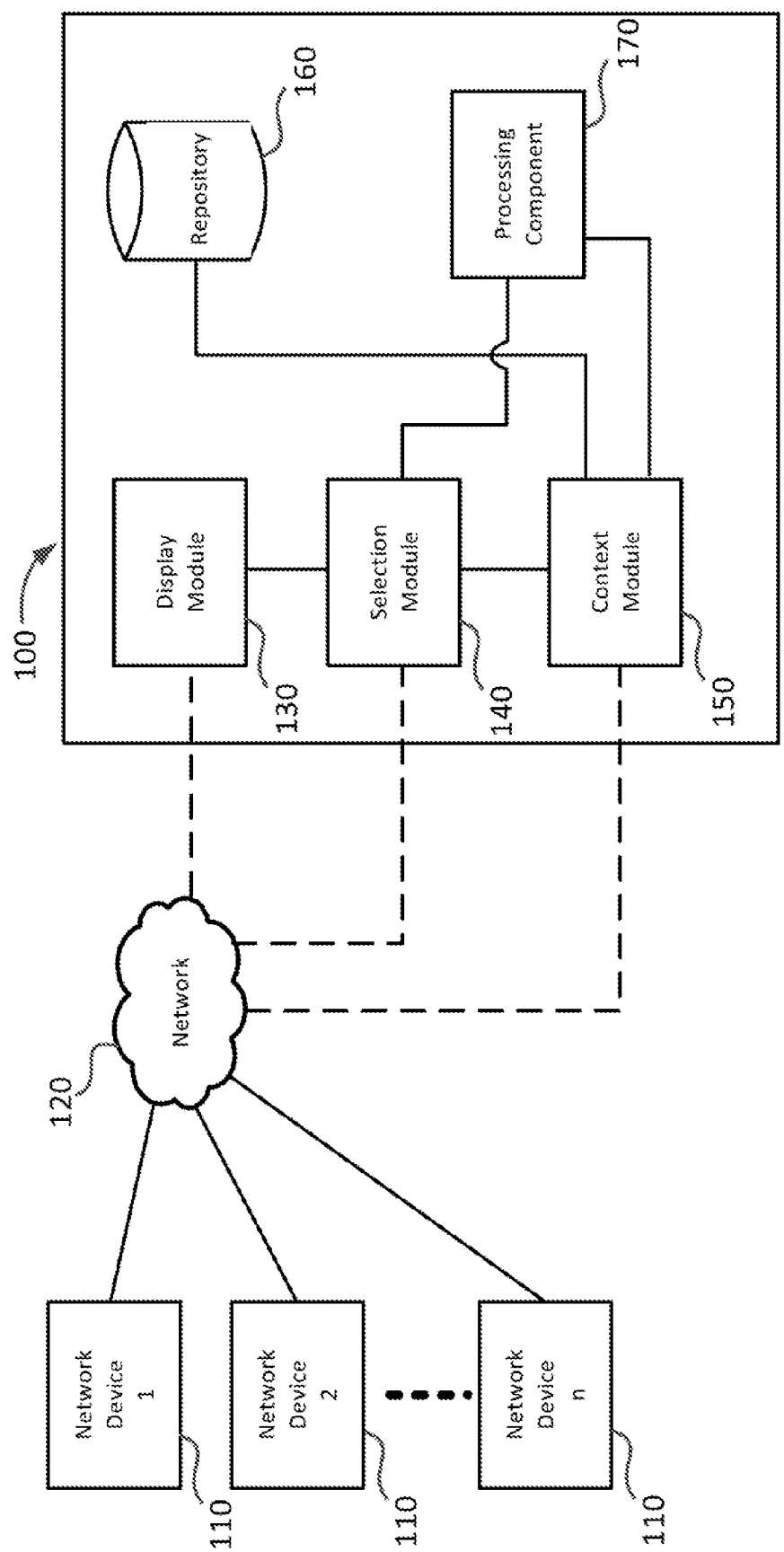
FIG. 1 is a illustration of some components of a system for status updates.

FIG. 1 illustrates an embodiment of a system for status updates 100. The system 100 is network enabled such that a plurality of users' network devices 110 may be connected via a network 120. The network 120 may be the Internet, a Local Area Network (LAN), a Wide Area Network (WAN), a Personal Area Network (PAN), an enterprise network, a Virtual Private Network (VPN), or the like. The network devices 110 are any of various known or to be known computing devices, such as a personal computer, a tablet computer, a mobile phone, smart phone, or the like.

The system 100 includes a display module 130 which is adapted to present a Graphical User Interface (GUI) to a user via the user's network device 110. The display module 130 may include an input unit (not shown) or may be operatively connected to an input unit. The input unit is configured to receive instructions from the user and transmit the instructions to the display module 130 and may be, for example, a touch screen, or the like.

The display module 130 allows the user to select an appropriate status from a predetermined list generated by a selection module 140 of the system for status updates 100. The system 100 further includes a context module 150 which may determine contextual data currently associated with the user. The contextual data associated with the user may be used to determine suggested status update options for the user. The context module 150 may review various user attributes, for example the user's geo-location, the user's activity, the user's calendar, the user's movement, user's recent social media inputs and the like, to determine a user context. The context module 150 may also review external attributes, for example, current time, weather, local transit schedules and the like, to determine a user context for suggested status updates.

The context module 150 may save the user context in a repository 160 or memory component, for example a database. The context module 150 may further match the user context with the selection criteria of predetermined statuses stored within the repository 160. Once the predetermined statuses are established, the statuses are sent to the selection module 140, which produces the status list to be displayed to the user via the display module 130. Once the user selects a status, the selection module 140 records and stores the status and is further adapted to update the status in an appropriate application.

The system further includes a processing component 170, for example at least one processor, designed to execute the instructions from the other modules of the system for status updates 100. Although the processing component 170 is shown as separate from the modules, each module may include a separate processor, or a processor may be shared by some modules.

The system 100 is intended to be integrated with various social media applications and other applications which include status information. The system 100 is configured to display to the user a fixed vocabulary of predetermined status updates or opening segments of status updated as opposed to allowing for the entry of fully free-form status updates. Having a fixed vocabulary is intended to facilitate creation of status updates and is also intended to increase the accuracy of data analytics that may be mined from the associated applications.

In operation, the context module 150 of the system 100 reviews the current user context to determine an appropriate user status update or to narrow or reduce the options for status updates to be displayed to the user. For example, if the user's calendar states the user is to be at an appointment in a specific location yet the user location shows the user to be moving towards, but not at the specific location, the system may suggest a status update to notify people at the location of a delay, for example, the suggested status update may be "running late but on the way".

Figure 2:
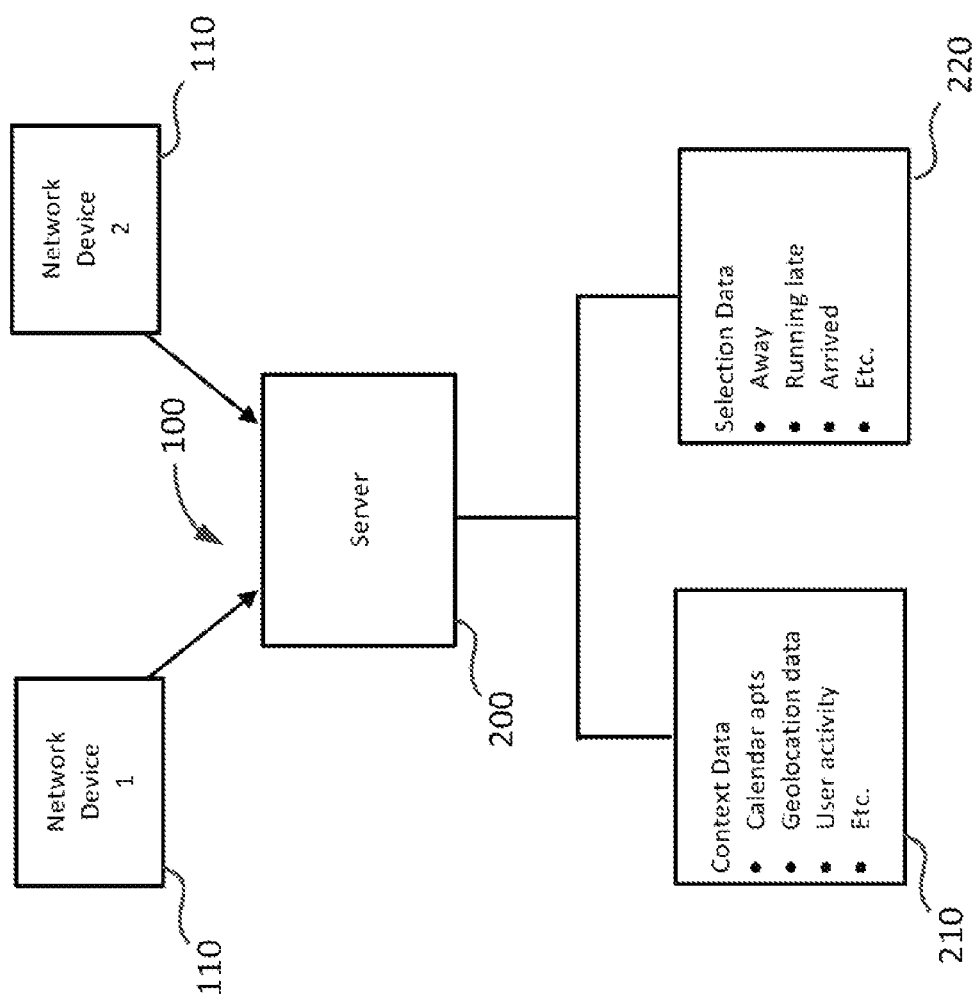
FIG. 2 is an overview of users accessing the system for status updates.

FIG. 2 illustrates network devices 110 accessing the system for status updates 100, wherein the system 100 resides on a network server 200. The system reviews context data 210 of the network device 110 accessing the system 100. The system 100 may review various applications and review recent user activity to determine the user context. The context data 210 is analyzed by the system 100 to determine at least one corresponding status from previously stored selection data 220. The at least one corresponding status update is displayed to the user via the network device 110.

In a specific example, a user may wish to update her status by issuing a user generated Twitter™ update. The system 100 may review the current time and the user's calendar application to determine that she has a class scheduled to start shortly at a school location. By reviewing the user's geo-location, the system 100 determines that the user is currently at the school location listed in the calendar application. Further, by reviewing recent user activity, the system 100 may discover that the user has been browsing online web pages with a network device 110. In analyzing the context data, the system 100 suggests a predetermined status of "in class, waiting for it to start" to the user. The system 100 may further prompt the user to see if the user would like to update the status in another application after sending the Twitter™ update. For example, the user may further wish to update her status on Facebook™ or other social networking sites.

In some cases, the context data may include geo-location data in combination with user movement data. The context module 150 may determine the location of a user and further determine if the user is moving. If the user is moving, the context module 150 may further review the user's speed, acceleration and the like to determine, for example the mode of transportation. In some cases, the context module may further review the movement against public transit databases to determine if the user is on public transit. With this data, the user may be suggested status updates by the selection module 140 such as, "on the bus", "on the street car", "in a car", or the like. In some cases, the user may choose to provide further details as to the location or the public transit in question. In other cases, the destination or reason as to the travel may be included on the status update, for example, "on the bus to get to class", "on the street car to go the library for study group" may be the suggested status updates presented to the user.

In some cases, the suggested status updates are selected from a predetermined taxonomy or folksonomy. The suggested status may be classified in a hierarchical or categorized manner such that the system 100 may easily group various statuses. In some cases, the suggested status may be based on social tagging or collaborative tagging. In some cases, the suggested status may be updated over time based on the use and/or non-use of various statuses by users of the system 100.

Figure 3:
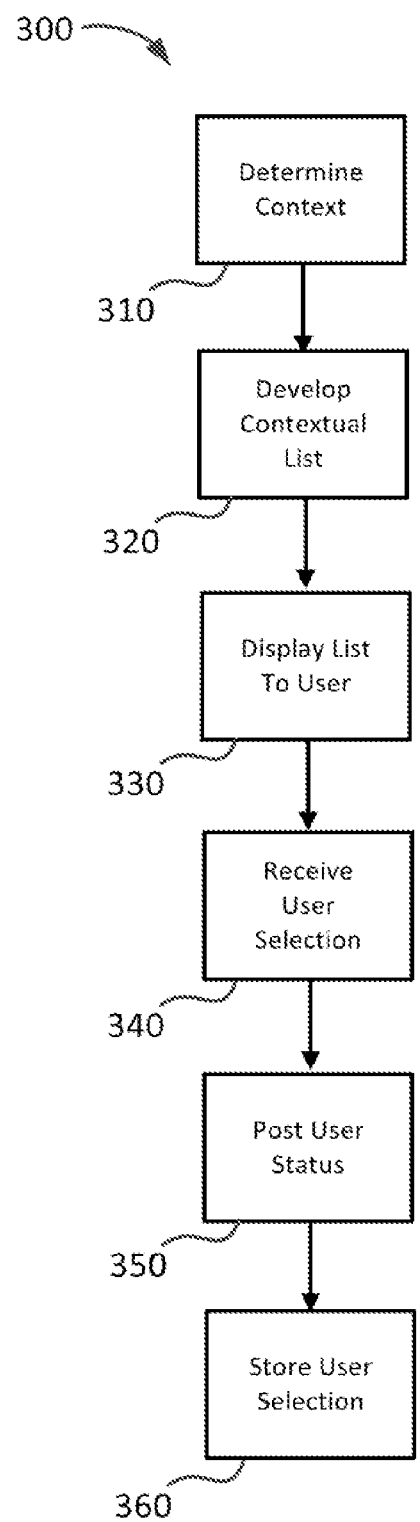
FIG. 3 is a flow chart of a method for status updates according to one embodiment.

FIG. 3 illustrates an embodiment of a method for status updates 300. At 310, the context module 150 determines a user context. For example, the user context may correspond to contextual data for a user. Typically, the determination of the user context will be based on a user requesting to update his status. However, it is also possible that the user context is determined whenever a user opens or accesses a social media application on the user's network device. Further, the user context may be determined on a periodic or continuous basis depending on settings for the system 100 or for the network device 110. As described herein, the contextual data may include user attributes and external attributes.

At 320, the context module 150 matches the user context with context criteria associated with various statuses stored in the repository 160 and the selection module 140 selects one or more appropriate statuses to create a contextual status list. The status list may have a single entry if only one entry matches the current user context or may have a plurality of entries if there is a plurality of matches. As the contextual status list is populated by predetermined status wording, it is intended that there will be a predetermined number of potential status updates that would apply to a user given the user's contextual data. The status wording may be augmented or further detailed by reviewing the user context, for example, providing the user's location, the user's current or upcoming activity, or the like. For example, a base status update may be "In class" and an updated status update may be "In class—<class name>" where the <class name> component may be inserted by the system 100 based on the user's calendar indicating that the user has, for example, a "biology" class at that time. As these augmented statuses may still include a common base status stored in the repository 160, these augmented statuses are intended to remain easily classified for tracking or data mining applications of the system 100.

At 330, the display module 130 displays the status list to the user. The status list may be displayed in a drop down menu or as a list showing the user the various statuses from which the user can select the most appropriate entry. As noted above, in some cases, the user will be shown both a base status update and an augmented status update and the user can select a level of detail the user wishes to share on the status update. In other cases, the user may be shown only the base status first than asked whether or not the user wishes to include augmented information. In still other cases, the user may select the base status and may then enter free form augmented information to update the status.

At 340, the selection module 140 receives the user selection via the network 120. At 350, the selection module 140 then posts the user status to the desired application. At 360, the system 100 further stores the user selection in the repository 160. In some cases, the system 100 may ask the user if the user wishes to update the status in any other social media application. If so, the system 100 posts the user status to the other applications selected by the user. The user may also have the option of setting predetermined social media sites to be automatically included in all or select updates.

Figure 4:
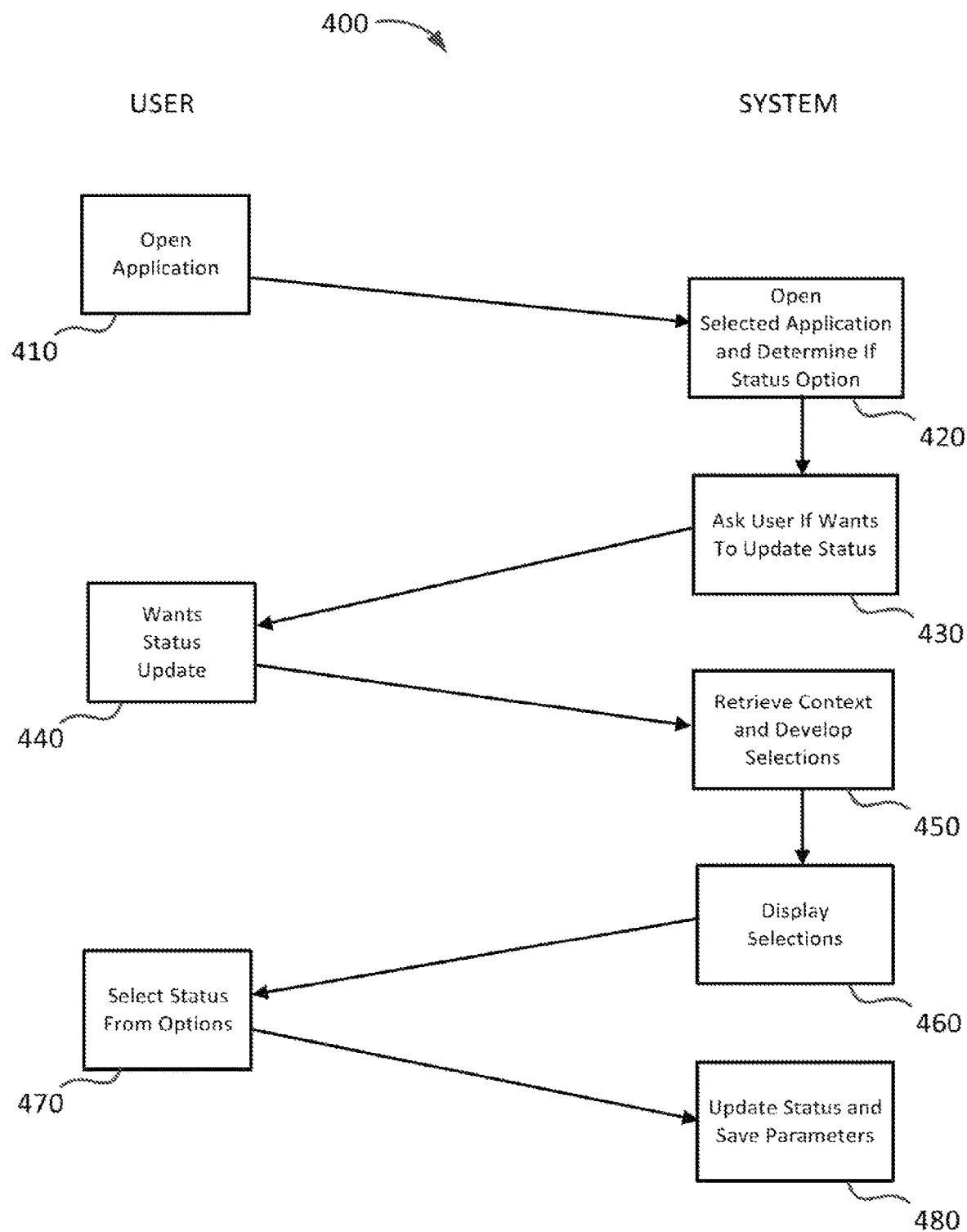
FIG. 4 is an example of a use case of a user updating the user's status.

FIG. 4 illustrates an example use case 400 of a user updating her status via the system 100. At 410, the user begins by opening a social media application or social media webpage. At 420, the system 100 reviews the opened application and determines that there is a user status option in the application. At 430, the system 100 asks the user if she wants to update her status. The system 100 may use a prompt or pop-up message to ask the user or may otherwise determine if the user wants to update her status by the user's input into the system.

At 440, the user responds by indicating that she does wish to update her status. At 450, the system 100 retrieves contextual data, such as user attributes and external attributes, to develop the selection of suggested status updates. After determining the suggested status updates, the system 100, at 460, displays the selection to the user. At 470, the user selects a status from the selections. In some cases, the user may augment the status by adding further details to the suggest status. At 480, the system 100 updates the user status and saves the status and contextual data in the repository.

In some cases, the system 100 may determine that the user has updated the status in a particular application and ask the user if the user would like to make similar updates in other applications. For example, if the user updates the user's status in one social media application, the system 100 may ask the user if the user wishes to make similar status update in one or more other social media applications.

In some cases, the system 100 may initiate the method 300 for updating a user status. The system 100 may retrieve contextual data that shows a status change by the user. For example, the system 100 may note that the user has a calendar appointment for a dentist appointment that overlaps a business meeting. The system 100 may suggest the user update the user's status in order to convey to others at the business meeting that the user' will be late as the user will be at the dentist.

It will be understood that the use case of FIG. 4 is just one example and that variations are possible. For example, as noted above, the status update may be suggested by the system 100 based on context. Further, the system 100 may determine context in advance of the user indicating a desire to issue a status update. In this case, the system 100 may present a list of contextual status updates at the same time as asking if the user would like to issue a status update.

Figure 5:
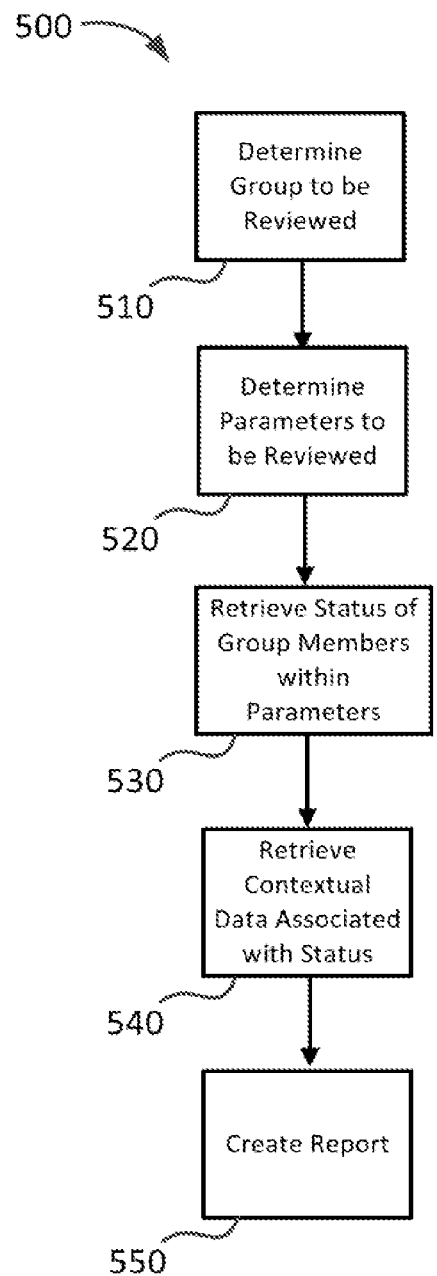
FIG. 5 is a flow chart of method for data mining using the system for status updates.

FIG. 5 illustrates a flow chart of an embodiment of a method for data mining based on embodiments of the system and method herein. Data mining capabilities may be present for administrators of the system 100, or for other groups or sub-groups of users that are given permissions to access this functionality. In this embodiment, at 510, the system 100 requests the data mining user to indicate a group to be reviewed for data mining. In some cases, the group can be indicated based on saved contextual data such as user attributes, for example, users having the same class scheduled in an educational setting. In other cases, the group may be indicated by the type of status updates, for example, users stating that the users were arriving at a desired location by public transit.

Once a group has been selected, the system 100 requests the parameters to be reviewed at 520. For example, for a group defined as attending the same class, the data mining user may wish to see all status updates and geo-location of users in the group at the time that class started. For the group using public transit, the user may wish to determine the status of the users during the time on the transit and the geo-location of the user after the next status update showing the user no longer on public transit.

At 530, the system 100 retrieves the status of the group members within the selected parameters. At 540, the system 100 may further retrieve other contextual data, such as user attributes or external attributes, associated with the status updates of the group members within the selected parameters. At 550, the system 100 then creates a report or otherwise displays the retrieved data to the user in an appropriate manner.

In a particular example, embodiments of the system and method herein may be used in tracking data related to an event. The system may monitor attendees that have accepted the invite to determine attendance at the event. Similarly, the system may determine attendees on their way to the location of the event but who have yet to arrive. Organizers of the event may be updated as to the attendees who will be late either by the system or by being notified of the specific attendee's status update. The system may further be used after the event to review the status of the attendees while at the event as well as the status and location of invitees who were unable to attend the event. The system is intended to be beneficial to organizers to review contextual user data before, during and after hosting an event. The organizers may be able to use the data in planning further events. The system is intended to provide feedback to the organizers based on status updates without requiring additional active feedback by the attendees or invitees of the event such as a survey or the like.

In another specific example, embodiments of the system and method herein may be linked to a learning management system. In this example, the system may provide suggested updates related to the grades and assignments of the students. In some cases, the system may determine, via the contextual data, and in particular the user attributes, that the student has to complete an assignment the next day. In this case, the system may suggest status updates such as: "<class name> assignment—completed", ""<class name> assignment—working on assignment", ""<class name> assignment—procrastinating", ""<class name> assignment—stuck and need help", or the like. In some cases, where a student updates his status to ""<class name> assignment—stuck and need help", the system may review the contextual data and ping, prompt or otherwise notify an appropriate individual, for example the instructor, a teacher's assistant helping the instructor, or the like. In some cases, the instructor may receive tracking information as to when students updated their status to "working on assignment" and the time the status was "working on the assignment". Tracking this data is intended to benefit the instructor by giving the instructor an understanding as to the habits of students when working on an assignment and how many students were either stuck or having difficulty to complete the assignment.

In another example where an embodiment of the system and method is linked to a learning management system, the system may include predetermined suggested statuses related to a student's marks and or grades of an assignment, test or other marked material. If a student receives a good grade, the system may suggest an updated status for the user such as "<class name>—I received an A" or "I received a 90%". In other cases, the system may suggest updates such as, "I did poorly on the test, can someone help me review the answers" or "I failed the assignment, does someone know what the professor was looking for". These status updates may not only be beneficial to the instructors of the students but also to the administration of the educational institution as the administration may be able to determine if an excessive number of students are doing poorly in a class, or if students appear to be excelling under one instructor yet not achieving similar results with another instructor.

In some cases, the suggested status update may be send to a group of users within the learning management system. For example, if the user, a student, selects a status update such as "I did poorly on the test, can someone help me review the answers", the status update may be sent to a group of users, for example, users who are in the same class, users who took the same test, teaching assistances for the class, the instructor of the class, or the like. In another example, the user may be an instructor who is late for class and the selected status update may be "running late but on the way". The selected status update may be sent to the group of users or students of the learning management system scheduled for the class to update them on the instructor's status.

Other examples where such status updates would be beneficial for data analytics and data mining are plentiful and the above description describes only a few particular examples. By having the suggested status updates predetermined, the system for status updates can more readily determine common statistics and common statuses without having to parse independent free-form statuses to determine if there is wording implying similar status.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Further, although the system 100 has been shown as accessed through the network 120, elements of the system 100 may be provided on the network device 110, within the network 120, or on a single or distributed servers. Still further, contextual information may be received from various sources outside of the system 100 and repository 160, including from the network device 110 and other sources such as a learning management system or the like.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for providing a status update comprising:
determining contextual data related to a first user, wherein the contextual data is related to an event associated with a profile of the first user in a learning environment managed by a learning management system;

retrieving context criteria associated with predetermined status updates;

retrieving suggested status updates in response to a match between the contextual data and the context criteria associated with the predetermined status updates;

presenting the suggested status updates to the first user;

receiving a selected status update and augmented contextual data associated with the selected status update from the first user; and posting an augmented status update based on the selected status update and the augmented contextual data, wherein the augmented status update is posted to at least two social network services selected based on input from the first user or the learning management system; and in response to the augmented status update being posted, analyzing the augmented status update, and determining a second user to whom to provide the augmented status update, wherein there is, based at least in part on the augmented status update, an association of the second user with the first user, wherein a profile of the second user is associated in the learning environment with the event, and wherein the association of the second user with the first user includes a course for which the first user and second user are registered; and sending, to the second user, a message including an indication of the augmented status update and the first user.

2. The method of claim 1 wherein the contextual data comprises user attributes.

3. The method of claim 2 wherein user attributes comprise at least one user attribute selected from among: user's calendar information, user's geo-location, user's movement, and user's social media inputs.

4. The method of claim 1 wherein the contextual data comprises external attributes.

5. The method of claim 4 wherein external attributes comprise at least one external attribute selected from among: time, weather, traffic information and transit schedules.

6. The method of claim 1 wherein the suggested status updates are selected from a predetermined taxonomy.

7. The method of claim 1 further comprising: tracking statistics related to the selected status updates.

8. The method of claim 1 further comprising: posting the status update to multiple social networking sites.

9. The method of claim 1, wherein the first user is associated with a course provided in the learning environment, and the determining of the second user comprises selecting the second user from among a plurality of other users associated with the course.

10. The method of claim 1, further comprising:
contemporaneously providing the augmented status update to a plurality of social networking platforms.

11. The method of claim 1, wherein the contextual data is obtained from a storage associated with the learning management system, and the posting of the augmented status comprises providing the augmented status update to the one or more servers associated with the one or more social network services.

12. The method of claim 11, wherein the one or more social network services to which the augmented status update are selected based on predefined user preferences.

13. A non-transitory computer readable medium containing instructions that, when executed, perform the method of claim 1.

14. A system comprising:
one or more processors configured to:
determine contextual data related to a first user, wherein the contextual data is related to an event associated with a profile of the first user in a learning environment managed by a learning management system;

retrieve context criteria associated with predetermined status updates;

retrieve suggested status updates in response to a match between the contextual data and the context criteria associated with the predetermined status updates;

present the suggested status updates to the first user;

receive a selected status update and augmented contextual data associated with the selected status update from the first user; and post an augmented status update based on the selected status update and the augmented contextual data, wherein the augmented status update is posted to at least two social network services selected based on input from the first user or the learning management system; and in response to the augmented status update being posted,
analyze the augmented status update, and
determine a second user to whom to provide the augmented status update, wherein there is, based at least in part on the augmented status update, an association of the second user with the first user, wherein a profile of the second user is associated in the learning environment with the event, and wherein the association of the second user with the first user includes a course for which the first user and second user are registered; and send, to the second user, a message including an indication of the augmented status update and the first user, and one or more memories coupled to the one or more processors and configured to provide the one or more processors with instructions.

15. The system of claim 14, wherein the one or more memories are configured to store the suggested status updates and the selected status update.

16. The system of claim 15, wherein the one or more memories are further configured to track statistics related to the selected status updates.

17. The system of claim 14 wherein the contextual data comprises user attributes.

18. The system of claim 14 wherein the contextual data comprises external attributes.

19. The system of claim 14, wherein the one or more processors are further configured to select suggested status updates from a predetermined taxonomy.

20. The system of claim 14, wherein the one or more processors are further configured to post the selected status update to multiple social networking applications.

21. The system of claim 14, wherein the one or more processors are further configured to retrieve contextual data from the learning management system.

22. The system of claim 21 wherein the retrieved contextual data from the learning management system includes data related to the user's classes, grades or assignments.

23. The system of claim 21, wherein the one or more processors are further configured to send the selected status update to a group of users within the learning management system.

* * * * *